United States Patent
Nakakubo et al.

(10) Patent No.: US 7,125,258 B2
(45) Date of Patent: Oct. 24, 2006

(54) CARD-TYPE TERMINAL

(75) Inventors: Koji Nakakubo, Kawasaki (JP); Hiroyuki Kawai, Kawasaki (JP); Kiyoshi Nakamichi, Hyogo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/765,187

(22) Filed: Jan. 28, 2004

(65) Prior Publication Data

US 2004/0190386 A1 Sep. 30, 2004

(30) Foreign Application Priority Data

Mar. 31, 2003 (JP) .............................. 2003-094097

(51) Int. Cl.
*H01R 12/00* (2006.01)

(52) U.S. Cl. ........................................ 439/64; 439/328

(58) Field of Classification Search .................. 439/64, 439/328, 928.1
See application file for complete search history.

(56) References Cited

U.S. PATENT DOCUMENTS

| | | | | |
|---|---|---|---|---|
| 5,155,663 | A * | 10/1992 | Harase ........................ | 361/684 |
| 5,315,478 | A | 5/1994 | Cadwell et al. | |
| 5,653,596 | A * | 8/1997 | Banakis et al. ............... | 439/64 |
| 5,655,917 | A * | 8/1997 | Kaneshige et al. .......... | 439/155 |
| 5,971,280 | A | 10/1999 | Hoolhorst ................... | 235/486 |
| 6,050,848 | A * | 4/2000 | Yao ............................. | 439/483 |
| 6,101,372 | A | 8/2000 | Kubo ........................... | 455/90 |
| 6,261,113 | B1 | 7/2001 | Chen ........................... | 439/260 |
| 6,392,879 | B1 * | 5/2002 | Chien .......................... | 361/685 |
| 6,407,982 | B1 * | 6/2002 | Aoki et al. .................. | 720/733 |
| 2002/0006751 | A1 | 1/2002 | Bricaud et al. ............. | 439/630 |

FOREIGN PATENT DOCUMENTS

| | | |
|---|---|---|
| EP | 0 743 717 A2 | 11/1996 |
| EP | 0 743 717 A3 | 2/2000 |
| JP | 10-154210 | 6/1998 |
| JP | 2000-182712 | 6/2000 |
| JP | 2001-101348 | 4/2001 |

OTHER PUBLICATIONS

Communication—European Search Report dated Aug. 2, 2004.

* cited by examiner

*Primary Examiner*—Thanh-Tam Le
(74) *Attorney, Agent, or Firm*—Westerman, Hattori, Daniels & Adrian, LLP.

(57) ABSTRACT

The present invention relates to a card-type terminal such as a PC card with a memory card such as a USIM card. It allows a memory card to be secured easily on a tray and inserted easily into a card-type terminal. A card-type terminal includes a tray slidable in and out freely with a memory card mounted, and a guide which helps the tray slide in and houses the inserted tray; in which the memory card is placed on the tray, which is slid into the guide, thereby installing the memory card in the card-type terminal. The tray has a holder which secures, to the tray, the forward-end center section of the memory card mounted along the insertion direction of the tray and an elastic restraining piece which secures, to the tray, the backward-end center section of the memory card mounted along the insertion direction of the tray.

8 Claims, 13 Drawing Sheets

CARD-TYPE TERMINAL

BACKGROUND OF THE INVENTION

1. Field of the Invention

The present invention relates to a card-type terminal such as a PC card in which a memory card such as a USIM card is installed.

2. Description of the Related Art

Card-type terminals, such as PC cards, equipped with wireless communications capabilities have been used recently. Taking a PC card as an example, it is equipped with wireless communications capabilities for accessing the Internet and is used being inserted in a slot in a notebook personal computer or the like. A memory card called a USIM card is inserted removably in the PC card to store personal information about Internet accesses.

Conventionally, card-type terminals in which a memory card is mounted include those which involve placing the memory card on a tray and inserting the tray, with the memory card placed, into the main body of the card-type terminal through a loading slot.

However, with this type of card-type terminal, the memory card is simply placed on the tray without being secured to it. Consequently, when the user tries to insert the tray, the memory card can easily fall off the tray or become displaced, causing the user to have trouble inserting the tray properly.

Another known type of conventional card-type terminal involves inserting a memory card alone directly into the main body of the card-type terminal through a loading slot. In this case, the memory card, which is small and thin, is not convenient for insertion and withdrawal. Also, the card-type terminal has sharp part of its metal cover exposed in the loading slot, which may damage a memory card when the memory card is inserted.

To solve the problems which can occur when plugging or unplugging a memory card into/from these card-type terminals, a configuration has been proposed which involves inserting a tray into the main body of the card-type terminal with a memory card mounted on the tray and securing the memory card to the tray when it is mounted (see Japanese Patent Laid-Open No. 10-154210).

However, the structure for securing a memory card to the tray proposed in Japanese Patent Laid-Open No. 10-154210 uses hooks protruding toward the center of the tray from both ends of the tray in a direction parallel to the insertion direction of the tray, and thus the memory card is mounted on the tray from a side rather than along the insertion direction of the tray, resulting in poor operability. Also, with the technique disclosed in Japanese Patent Laid-Open No. 10-154210, the loading slot in the main body of the card-type terminal is open wider upward by the thickness of the hooks, increasing the thickness of the main body of the card-type terminal.

SUMMARY OF THE INVENTION

In view of the above circumstances, the present invention has an object to provide a card-type terminal with such a structure that allows a memory card to be secured easily on a tray and plugged and unplugged easily into/from the card-type terminal.

To achieve the above object, the present invention provides a card-type terminal equipped with:

a tray which can be slid in and out freely with a memory card mounted; and a guide which helps the tray slide in and houses the inserted tray, wherein the memory card is placed on the tray, the tray is slid into the guide, and thereby the memory card is installed in the card-type terminal, and the tray has a holder which secures, to the tray, the forward-end center section of the memory card mounted on the tray along the insertion direction of the tray.

In the card-type terminal of the present invention, since the holder which secures, to the tray, the memory card mounted on the tray is installed at the forward end in the insertion direction in which the tray is inserted in the card-type terminal, the memory card can be mounted on the tray easily by just putting it down on the tray with its forward end placed against the holder. Also, since the memory card mounted on the tray is secured to the tray by the holder, the tray with the memory card mounted can be inserted easily into the card-type terminal.

Here, in the card-type terminal of the present invention, preferably, the tray has an elastic restraining piece which secures, to the tray, the backward-end center section of the memory card mounted on the tray along the insertion direction of the tray.

When mounting the memory card on the tray, the backward end of the memory card is put down on the tray with the forward end of the memory card placed against the holder as described above. In so doing, since the elastic restraining piece is installed on that part of the tray which corresponds to the backward end of the memory card, when the memory card is mounted on the tray, the elastic restraining piece restrains the memory card, after being elastically deformed slightly by the backward end of the memory card. This allows the memory card to be secured easily to the tray more firmly.

Here, preferably, the card-type terminal of the present invention, has a metal cover which covers the guide and the guide has a pair of guards which demarcate a tray loading slot by sticking out from the edge of the metal cover and extend like cantilever beams from both sides of the width orthogonal to the insertion direction of the tray toward the center of the width, forming enough space between the guards to allow the elastic restraining piece to enter.

Card-type terminals are equipped with a metal cover to prevent noise, etc. The guards protect memory cards and the tray from damage caused by the metal cover. Also, since the guards form enough space to allow passage of the holder and elastic restraining piece, the entire card-type terminal can be made thinner accordingly.

Also, preferably, the card-type terminal of the present invention has a misinsertion prevention mechanism which prevents the tray from being inserted upside down into the guide. The misinsertion prevention mechanism can consist of convex portions provided on either the tray or guide and concave portions which are provided in the other and fit around the convex portion.

Also, preferably, the card-type terminal of the present invention has a safety catch which prevents the tray from falling off when the tray is drawn from the guide. The safety catch can consist, for example, of convex portions provided on either the tray or guide and concave portions which are provided in the other, extend in the insertion direction of the tray, slidably fit around the convex portions, and have an end wall brought into contact with the convex portions when the tray is pulled out from the guide.

Also, in the card-type terminal of the present invention, preferably, the tray has a tray-side restraining member which restrains the tray in the guide when the tray is inserted in the guide; and the guide has a guide-side restraining member which engages with the tray-side restraining member when the tray is inserted in the guide and a control lever which disengages the guide-side restraining member from the tray-side restraining member in response to operation of an exposed control end of the control lever. In this case, the tray-side restraining member may be configured as a concave portion formed in a lateral wall of the tray and the guide-side restraining member may be configured as a convex portion which is formed on that part of the tray which corresponds to the concave portion and fits in the concave portion.

As described above, the present invention allows a memory card to be secured easily on a tray and slid easily into a card-type terminal.

DETAILED DESCRIPTION OF THE PREFERRED EMBODIMENTS

Embodiments of the present invention will be described below.

Figure 1:
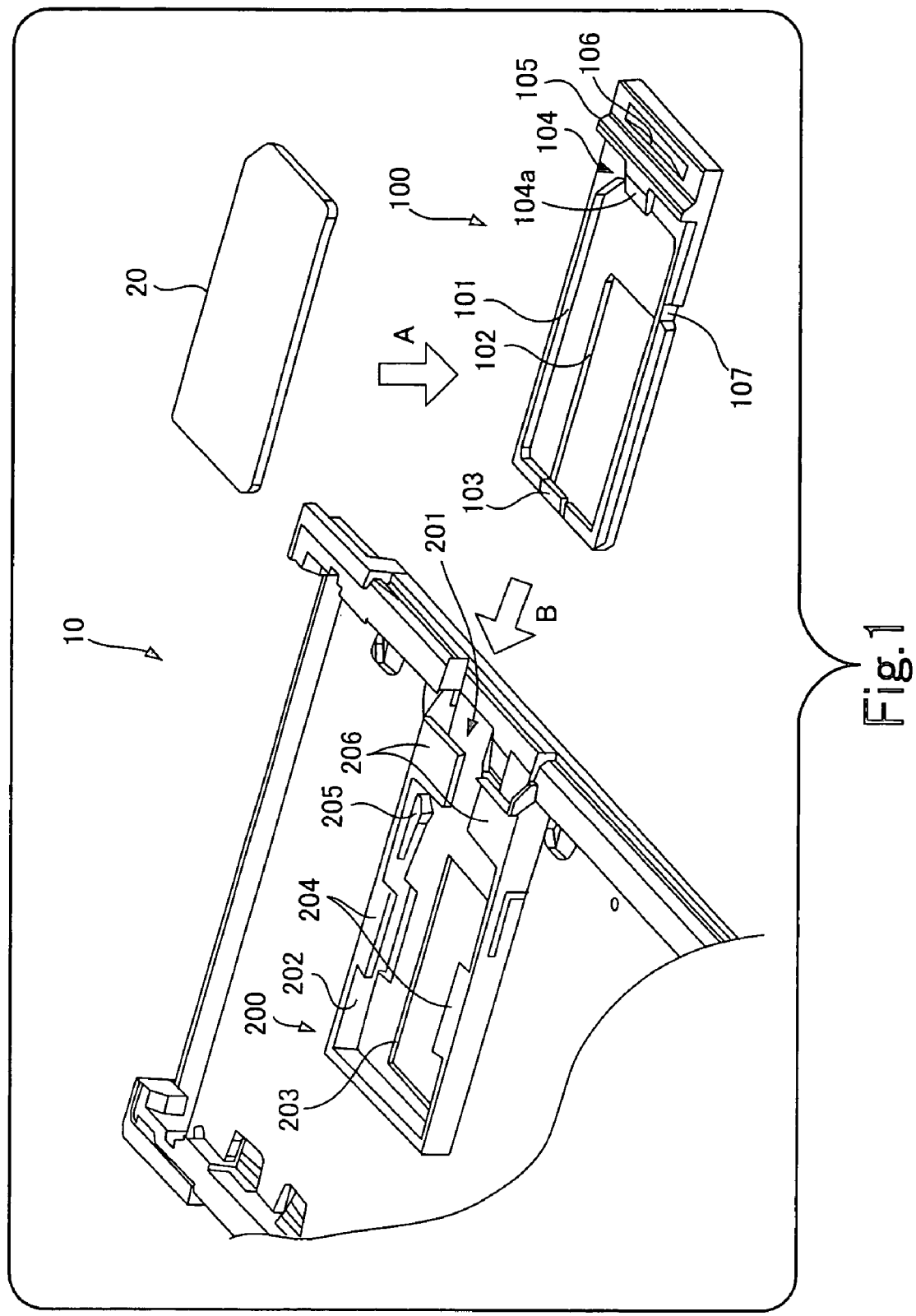
FIG. 1 is a perspective view of a card-type terminal according to a first embodiment of the present invention, showing those parts which are characteristic of the present invention.

FIG. 1 is a perspective view of a card-type terminal according to a first embodiment of the present invention, showing those parts which are characteristic of the present invention.

The figure shows a card-type terminal 10 equipped with a tray 100 and a guide 200 as well as shows a memory card 20 installed in the card-type terminal.

To install the memory card 20 in the card-type terminal 10, the user mounts the memory card 20 on the tray 100 (arrow A) and slides the tray 100, with the memory card 20 mounted, into the guide 200 along arrow B.

Figure 2:
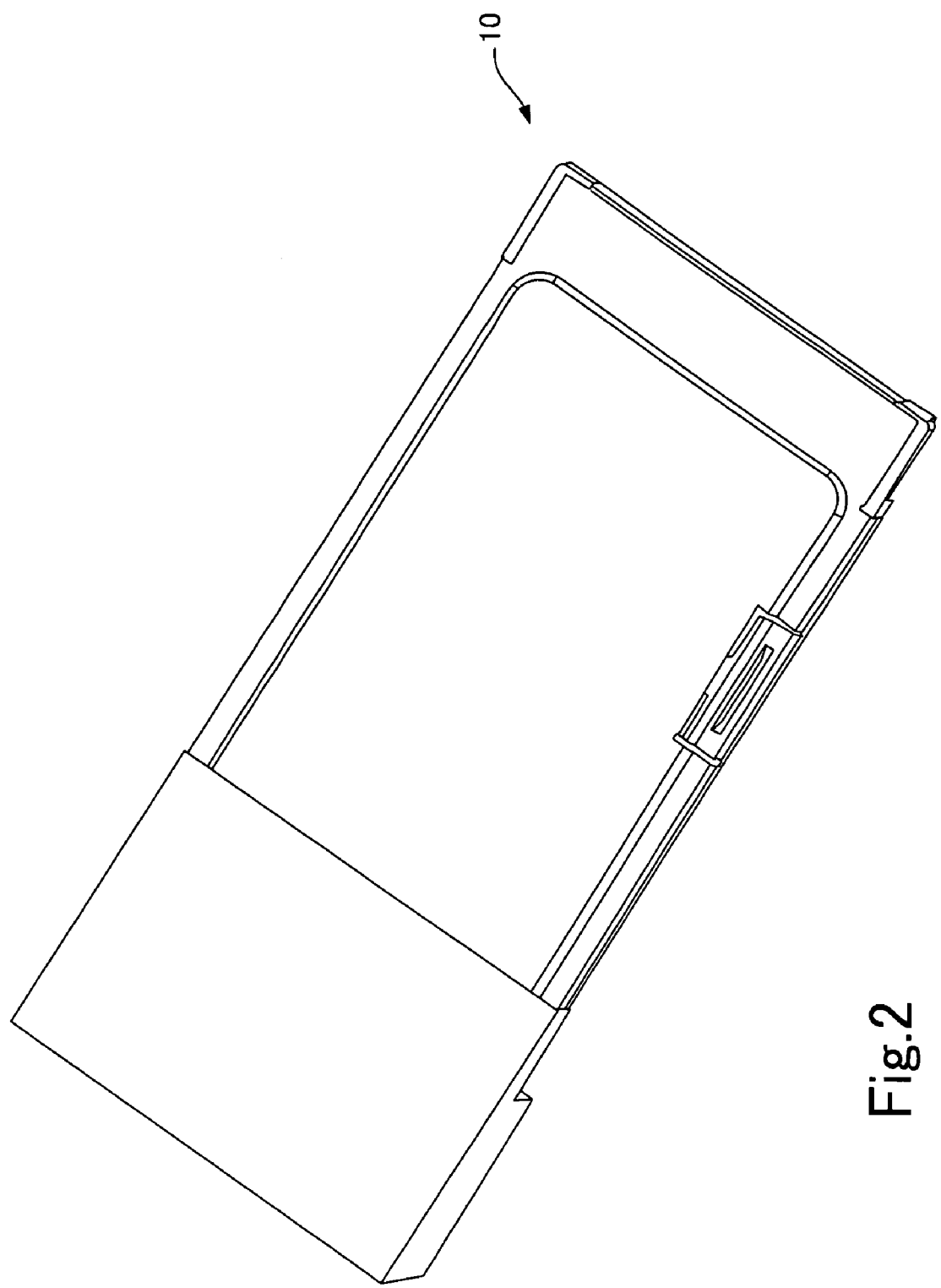
FIG. 2 is an external perspective view of the card-type terminal (on the side of a memory card loading slot)
Figure 3:
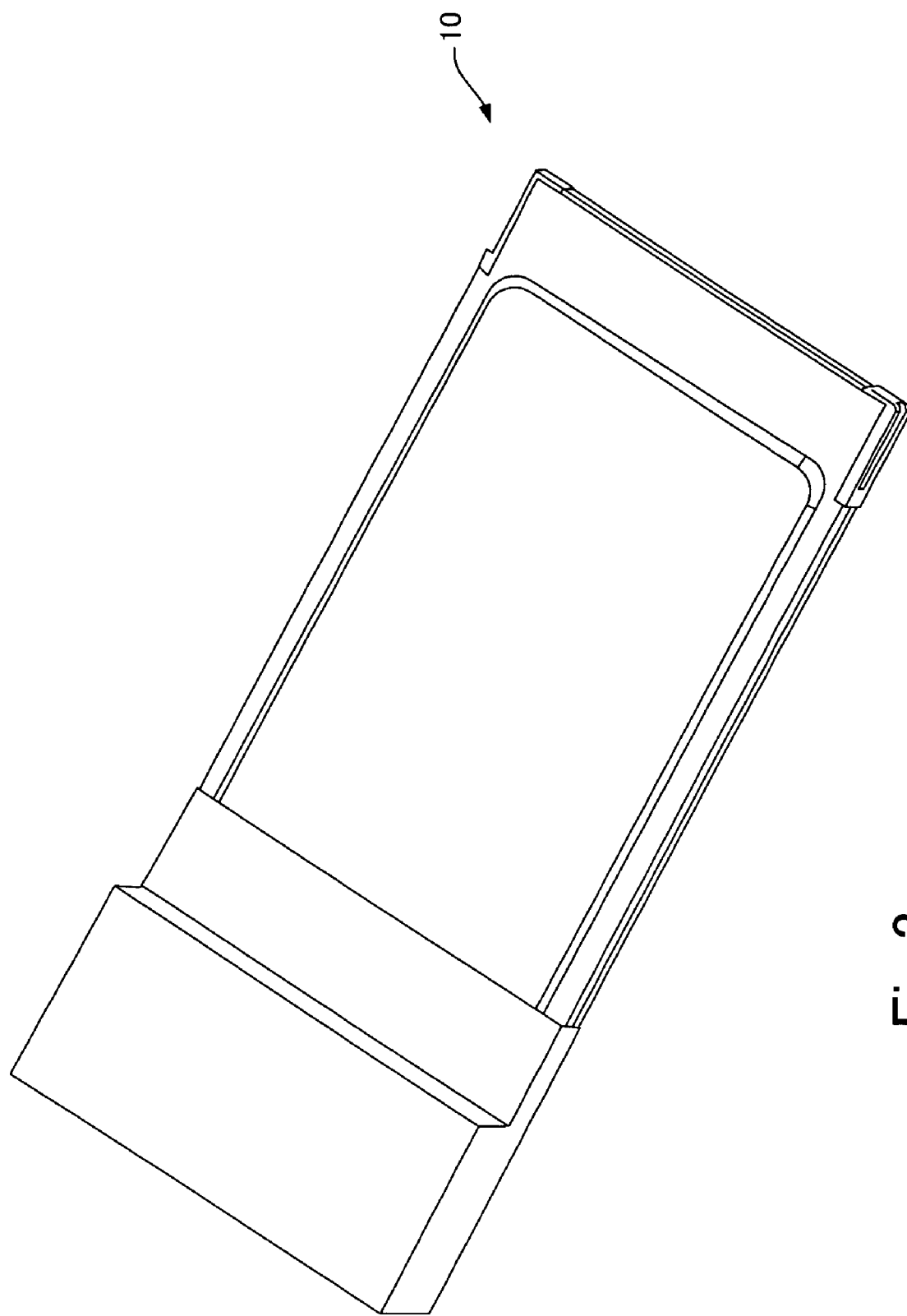
FIG. 3 is an external perspective view of the card-type terminal, showing the side opposite to the one shown in FIG. 2.

FIG. 2 is an external perspective view of the card-type terminal (on the side of a memory card loading slot) while FIG. 3 is an external perspective view of the card-type terminal, showing the side opposite to the one shown in FIG. 2.

Figure 4:
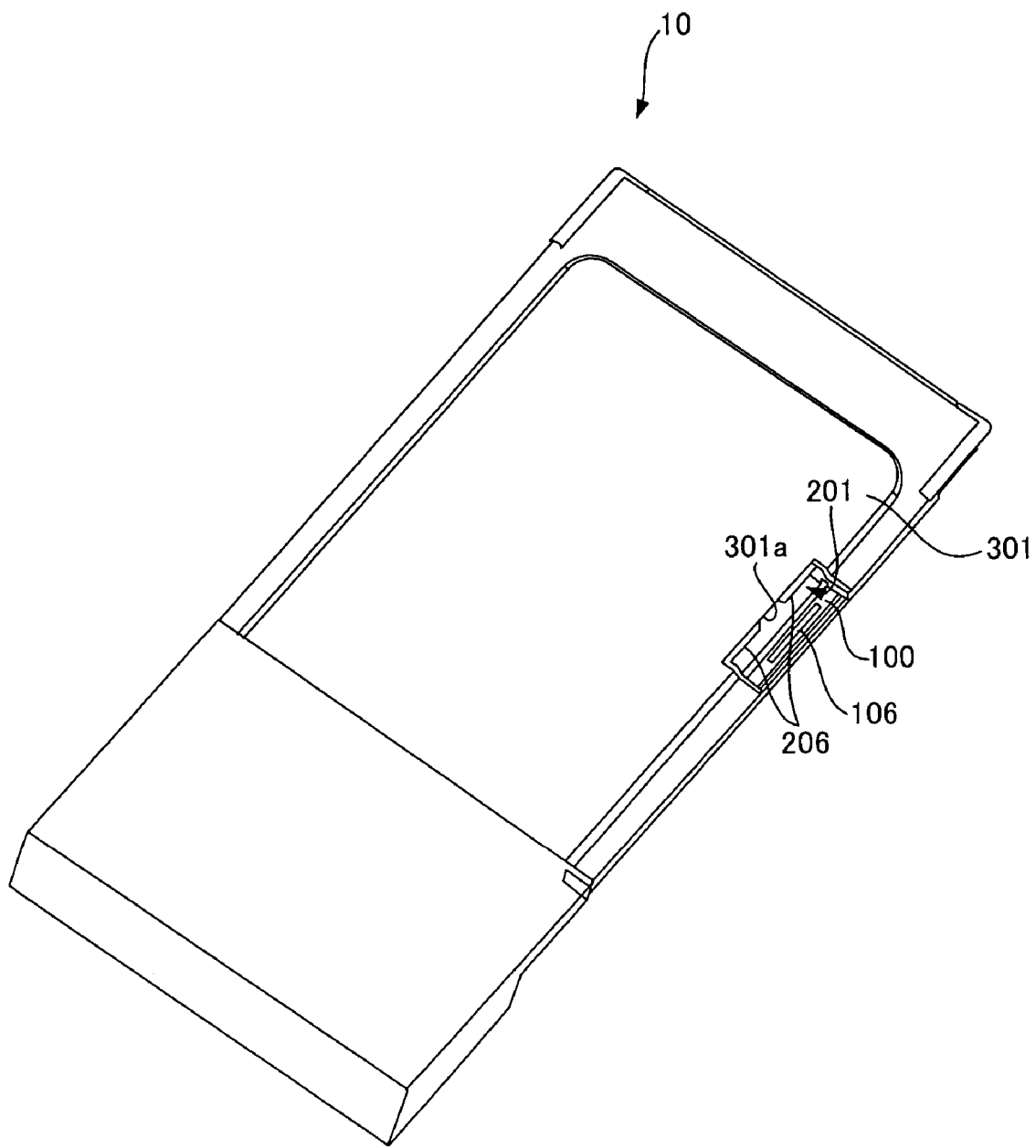
FIG. 4 is a perspective view showing the main body of the card-type terminal with a memory card fully inserted.
Figure 5:
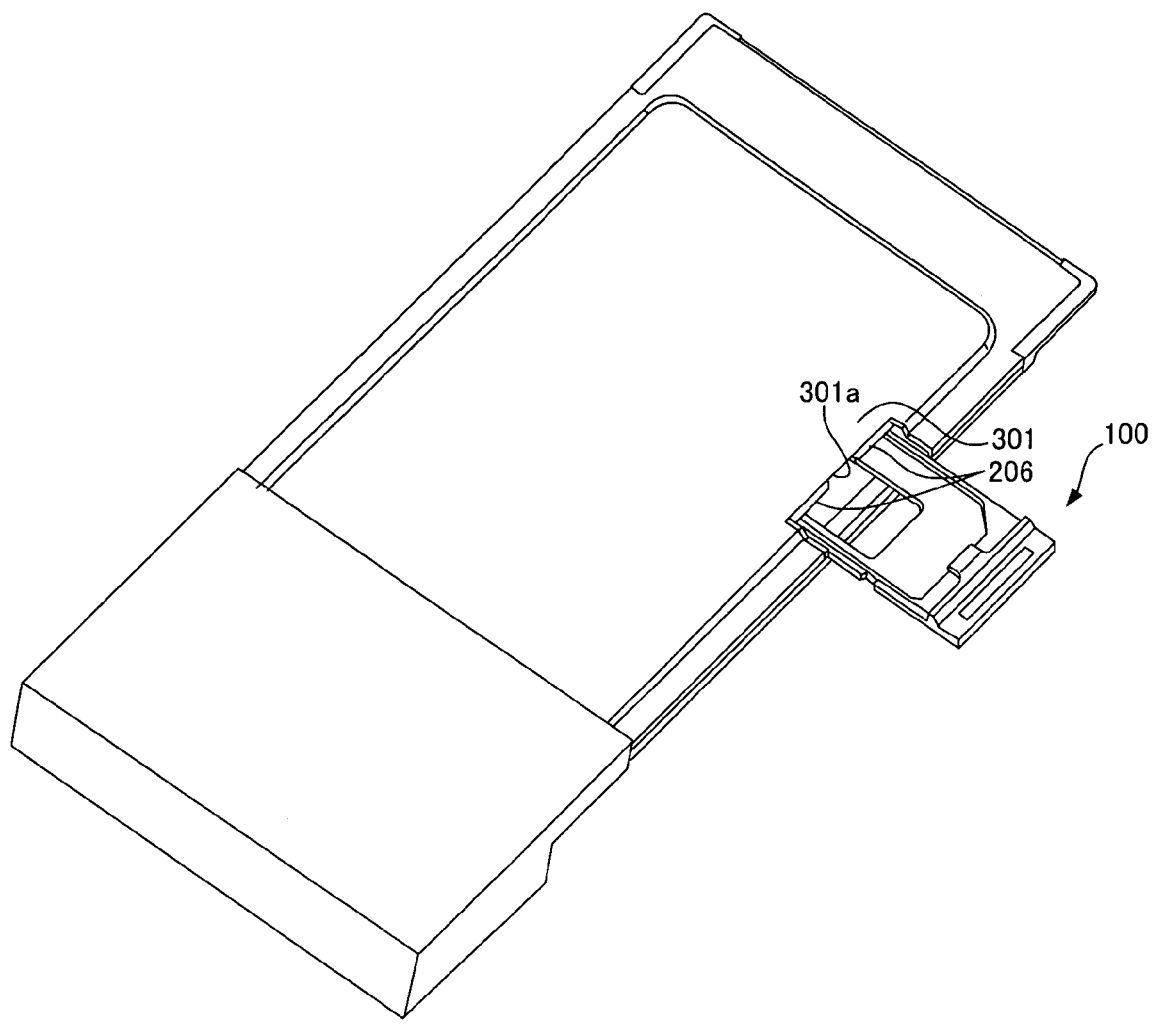
FIG. 5 is a perspective view showing the main body of the card-type terminal with the memory card withdrawn halfway.
Figure 6:
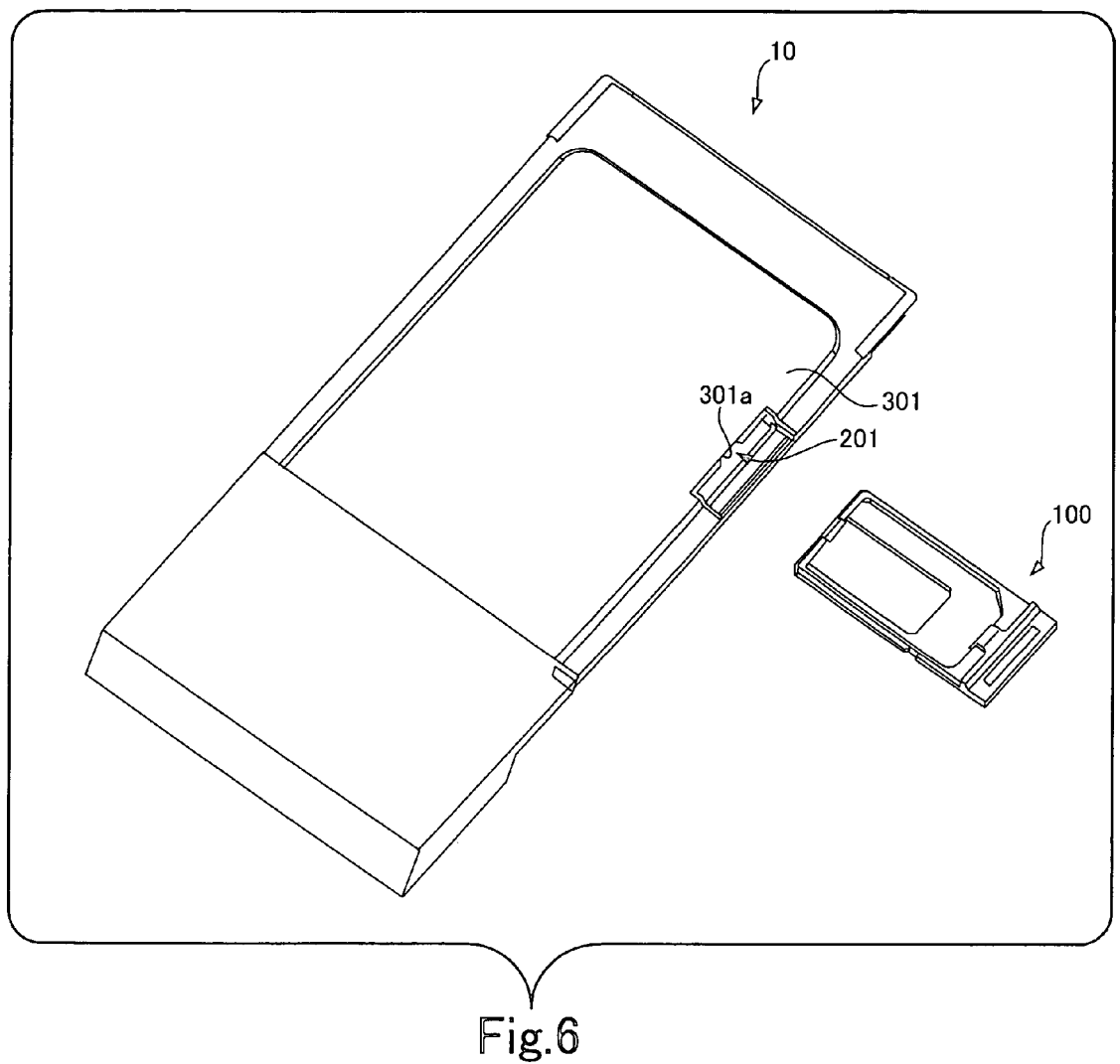
FIG. 6 is a perspective view showing the main body of the card-type terminal with the memory card withdrawn completely.
Figure 7:
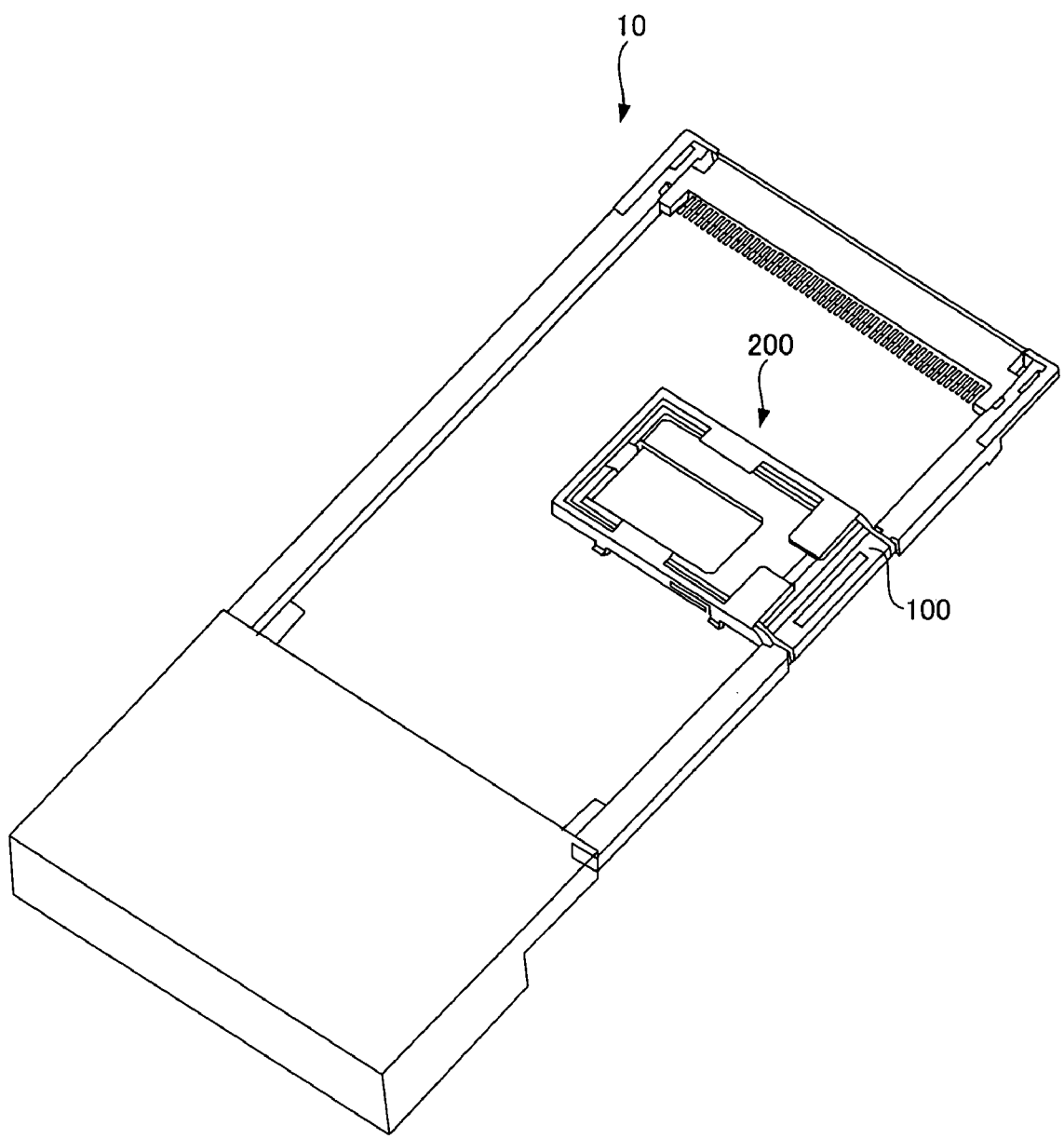
FIG. 7 is a perspective view showing a guide in the main body of the card-type terminal with a metal cover removed.
Figure 8:
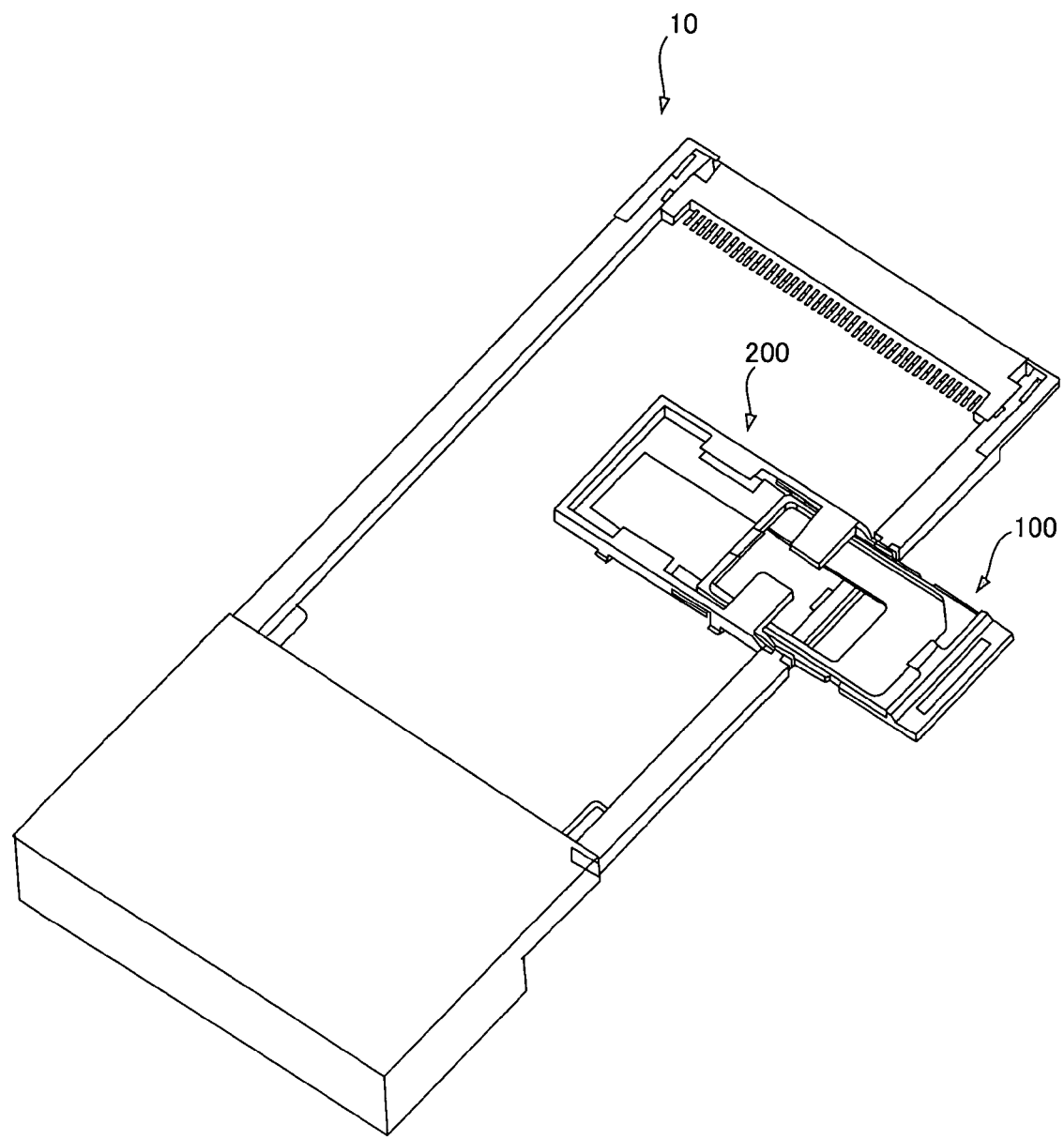
FIG. 8 is a perspective view showing a guide in the main body of the card-type terminal with a metal cover removed.
Figure 9:
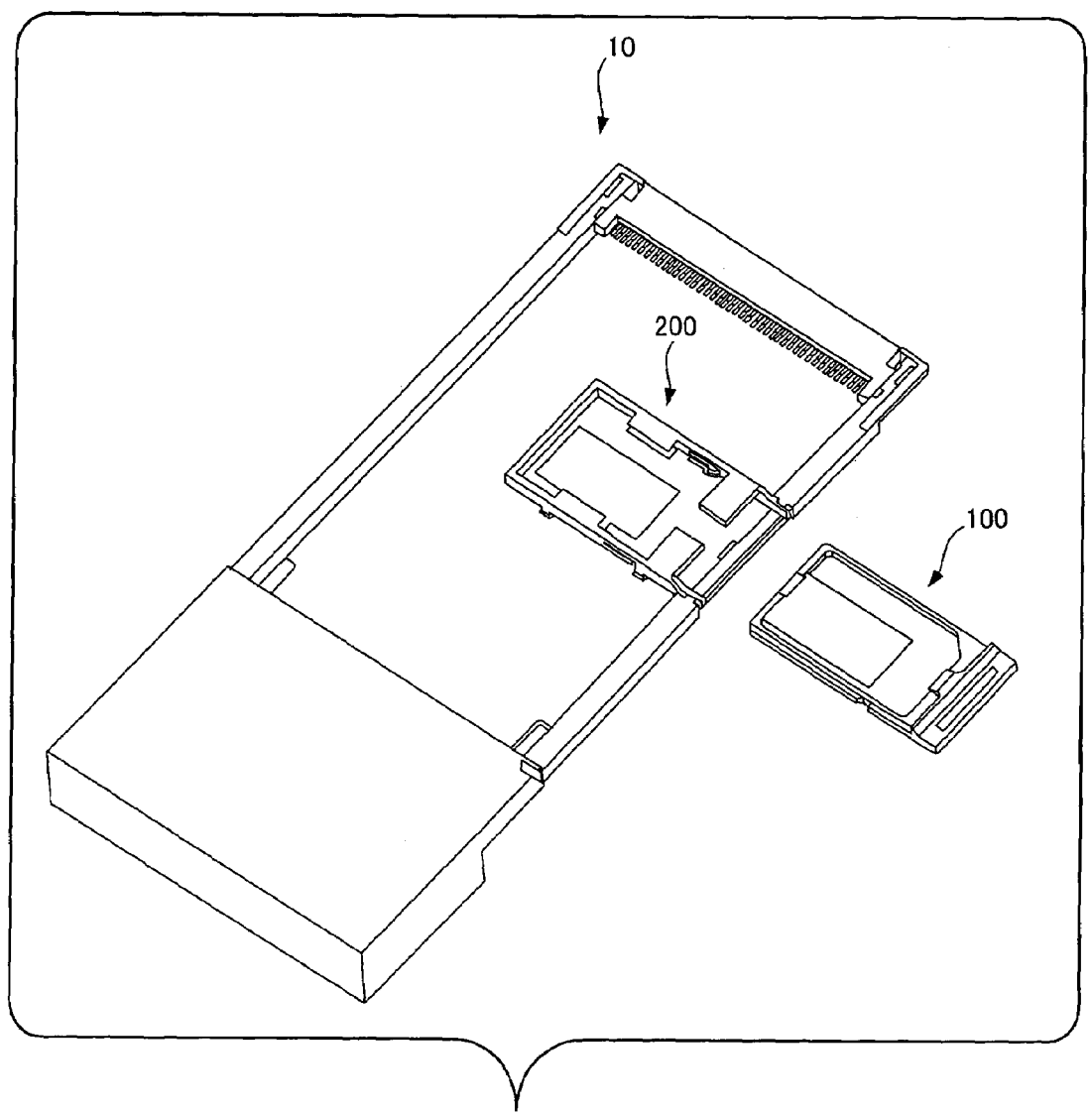
FIG. 9 is a perspective view showing a guide in the main body of the card-type terminal with a metal cover removed.

FIGS. 4, 5, and 6 are perspective views showing, respectively, the main body of the card-type terminal with the memory card fully inserted, with the memory card withdrawn halfway, and with the memory card withdrawn completely. FIGS. 7, 8, and 9 are perspective views showing the guide in the main body of the card-type terminal with a metal cover removed, where the tray is fully inserted, the tray is withdrawn halfway, and the tray is completely withdrawn, respectively, as in the case of FIGS. 4, 5, and 6.

Description will be continued below with reference to FIGS. 2 to 9 as well as FIG. 1.

The tray 100 has a recessed portion 101 contoured to the external shape of the memory card 20 and an opening 102 not large enough for the memory card 20 to pass through. The memory card 20 is mounted on the tray 100 in such a way as to fit in the recessed portion 101 of the tray 100. Also, the tray 100 has a holder 103 in the forward-end center section of the recessed portion 101, where the forward end is the forward end in the tray insertion direction (in the direction of arrow B in FIG. 1). The holder 103 secures the memory card 20 to the tray 100 by holding down the forward-end center section of the memory card 20 mounted in the recessed portion 101 of the tray 100 along the insertion direction.

Also, an elastic restraining piece 104 is provided in the backward end of the recessed portion 101 of the tray 100. The elastic restraining piece has a tapered portion 104a. When the backward end of the memory card 20 rides on the tapered portion 104a, the elastic restraining piece leads the memory card 20 forward by deflecting downward elastically and then the deflection separates the elastic restraining piece 104 from the memory card 20, fitting the memory card 20 in the recessed portion 101 and returning the elastic restraining piece 104 to its original shape to hold up the backward-end center portion of the memory card 20 fitted in the recessed portion 101.

Thus, to mount the memory card 20 on the tray 100, the user should lower the forward side of the memory card 20, slip the front edge of the memory card 20 into the holder 103 and press it against the front end of the recessed portion 101 by sliding the memory card 20 forward.

Then, the user should mount the memory card 20 in the recessed portion 101 by lowering its rear side. While the rear side of the memory card 20 is being lowered, when the rear edge center section of the memory card 20 rests on the tapered portion 104a of the elastic restraining piece 104, the user should press it down further by applying a little more force. This deflects the elastic restraining piece 104 a little downward, as described above, opening a pathway for the memory card 20. Consequently, the memory card 20 fits into the recessed portion 101 and its backward-end center portion is held down by the elastic restraining piece 104.

In this way, according to this embodiment, the memory card 20 mounted on the tray 100 has its forward end and backward end held by the holder 103 and elastic restraining piece 104, respectively.

The memory card 20 is mounted on the tray 100, being slid in the insertion direction with its forward side down. The mounting direction here is the same as the insertion direction in which the tray is inserted into the main body of the card-type terminal. This offers intuitive operation and high operability.

To remove the memory card 20 from the tray 100, the user should push the memory card 20 from behind the opening 102. The resulting slight deflection of the memory card 20 and tray 100 allows the memory card 20 to be removed from the tray 100.

The tray 100 is also equipped with a lid 105 which covers a loading slot 201 in the guide 200 after the tray 100 is slid into the guide 200, and a finger pull groove 106 which is located outside the loading slot 201 in the guide 200 when the tray 100 is inserted in the guide 200 and into which a finger nail is hooked to pull the tray 100 out of the guide 200.

Furthermore, mating recesses 107 are provided in both sides of the tray 100 (only one side is shown in FIG. 1). When the tray 100 is slid into the guide 200, the mating recesses 107 engage with mating projections 205 provided at locations corresponding to the locations of the mating recesses 107 (FIG. 1 shows only one mating projection 205 on the opposite side of the tray 100 from the mating recess 107 shown in the figure). The engagement makes the tray 100 snap into the guide 200 with a tactile response and prevents the tray 100 from easily coming off the guide 200 unless the tray 100 is pulled out intentionally by hooking a finger nail into the finger pull groove 106.

On the other hand, the guide 200 helps the tray 100 to slide in and houses the inserted tray 100.

The guide 200 has a tray housing 202 which receives the tray 100 inserted through the loading slot 201. The tray housing 202 has an opening 203 in its bottom face at the same position as the opening 102 in the tray 100 placed in the tray housing 202. An elastic armature (not shown) for electrical signal transmission enters the tray 100 through the opening 203. On the rear face of the memory card 20 is a contact at a location corresponding to the location of the elastic armature. When the memory card 20 mounted on the tray 100 is slid into the guide 200 together with the tray 100, the contact on the memory card 20 establishes an electric connection with the elastic armature to allow the main body of the card-type terminal to access the memory card 20.

Also, the guide 200 is equipped with a pair of pressers 204 which presses down both sides of the tray 100 slid into the guide 200, to prevent the tray 100 from floating up and secure the connection between the contact on the rear face of the memory card and the elastic armature (not shown).

Besides, the flanks of the guide 200 are provided with the mating projections 205 sticking out into the tray housing 202. As described above, the mating projections 205 fit in the mating recesses 107 of the tray 100 slid into the guide 200 to make the tray 100 snap into the guide 200 with a tactile response and to prevent the tray 100 from easily coming off the guide 200 inadvertently.

Furthermore, a pair of guards 206 are provided in the loading slot 201 in the guide 200, demarcating the loading slot 201. They extend like cantilever beams from both sides of the width orthogonal to the insertion direction of the tray 100 toward the center of the width, forming enough space between the guards 206 to allow the holder 103 of the tray 100 to pass and the elastic restraining piece 104 to enter.

As shown in FIG. 5, etc. the pair of guards 206 demarcate the tray loading slot 201 by sticking out from an edge 301a of the metal cover 301 of the main body of the card-type terminal which covers the guide 200. The metal cover 301 is used to prevent noise, etc. Since the guide 200 is equipped with the pair of guards 206 which stick out from the edge 301a of the metal cover 301 as described above, the memory card 20 and tray 100 are protected from being damaged by hitting the edge 301a of the metal cover 301.

If it were not for the space between the pair of guards 206, it would be necessary to enlarge the opening of the tray loading slot 201 in order to allow the holder 103 of the tray 100 and elastic restraining piece 104 to enter the tray loading slot 201. However, the space formed between the pair of guards 206 makes it possible to reduce the vertical dimension of the tray loading slot 201 and thus reduce the thickness of the entire card-type terminal 10 while avoiding interference between the guards 206 and the holder 103 or elastic restraining piece 104.

Figure 10:
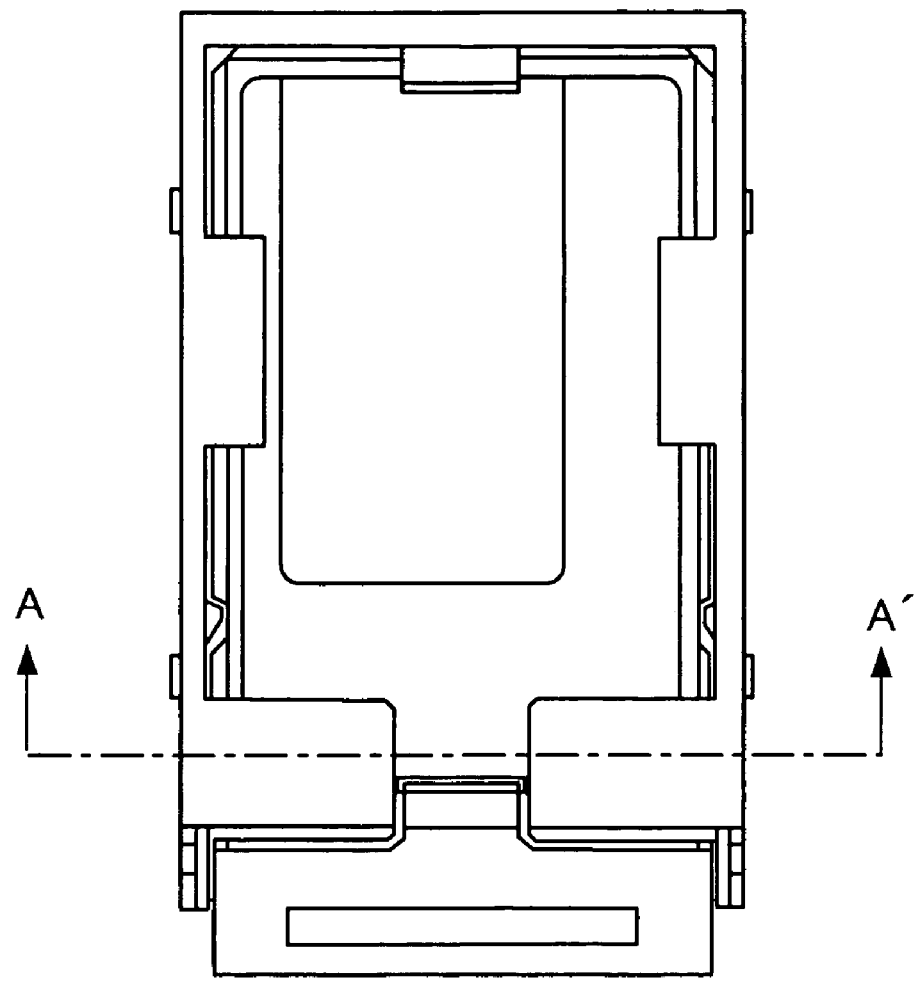
FIG. 10 is a plan view of the guide with the tray inserted.
Figure 11:
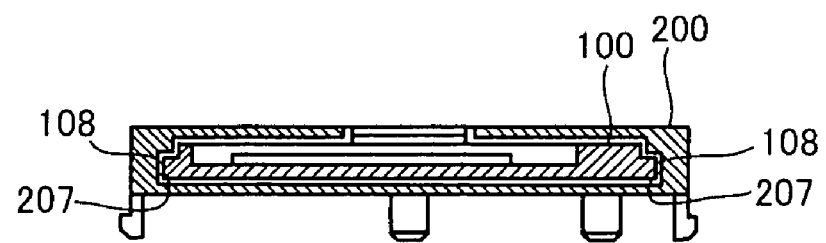
FIG. 11 is a sectional view taken along arrow A–A' in FIG. 10.

FIG. 10 is a plan view of the guide with the tray inserted while FIG. 11 is a sectional view taken along arrow A–A' in FIG. 10.

As shown in FIG. 11, the tray 100 has convex portions 108 formed on its flanks and extending in the insertion direction. On the other hand, the guide 200 has concave portions 207 formed in a side of the tray housing 202 (see FIG. 1), which extend in the insertion direction, and the convex portions 108 of the tray 100 fit in them slidably.

According to this embodiment, the convex portions 108 on the flanks of the tray 100 and the concave portions 207 in the side of the tray housing 202 of the guide 200 compose a misinsertion prevention mechanism which prevents the tray 100 from being inserted upside down into the guide 200.

This concludes description of the card-type terminal according to the first embodiment of the present invention. A second and subsequent embodiments of the present invention will be described below. Incidentally, illustration and description of components in common with the first embodiment will be omitted while showing only drawings which clearly illustrate differences from the first embodiment and describing only the differences. Also, components which correspond to those of the first embodiment will be denoted by the same reference numerals as the corresponding components of the first embodiment to facilitate understanding even though they differ slightly in shape, structure, or the like.

Figure 12:
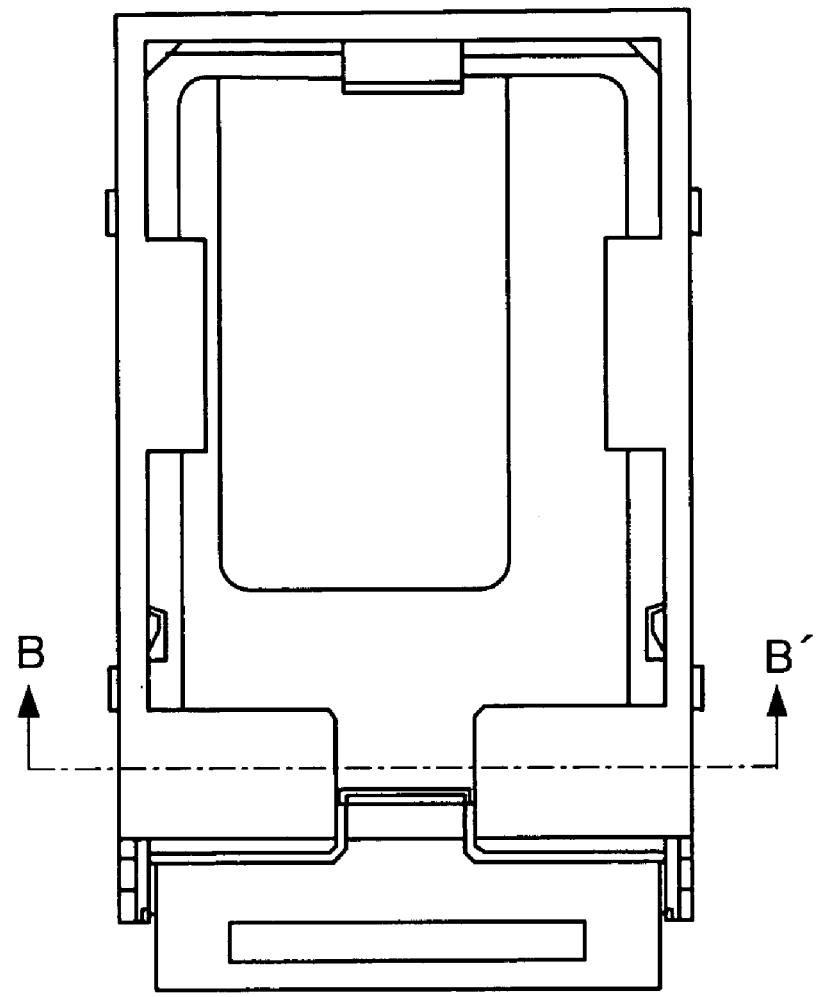
FIG. 12 is a plan view showing a guide in a card-type terminal according to a second embodiment of the present invention with a tray inserted in the guide.
Figure 13:
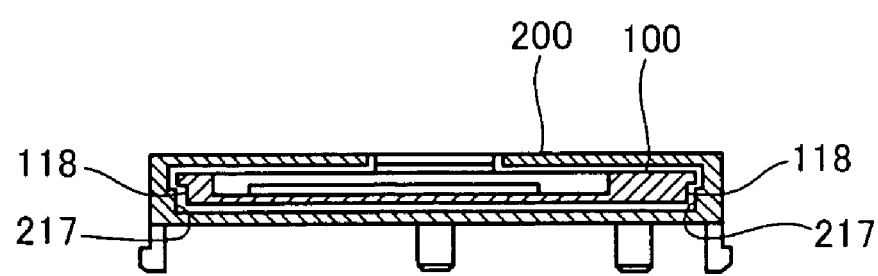
FIG. 13 is a sectional view taken along arrow B–B' in FIG. 12.

FIG. 12 is a plan view showing a guide in a card-type terminal according to a second embodiment of the present invention with a tray inserted in the guide while FIG. 13 is a sectional view taken along arrow B–B' in FIG. 12.

As shown in FIG. 13, the tray 100 has concave portions 118 formed in its flanks and extending in the insertion direction. On the other hand, the guide 200 has convex portions 217 formed on the side of the tray housing 202 (see FIG. 1). They extend in the insertion direction and slidably fit in the concave portions 118 of the tray 100.

According to the second embodiment, the concave portions 118 in the flanks of the tray 100 and the convex portions 217 on the side of the tray housing 202 of the guide 200 compose a misinsertion prevention mechanism which prevents the tray 100 from being inserted upside down into the guide 200.

In this way, the concave portions and convex portions which fit in the concave portions may be provided on whichever of the tray and guide.

Figure 14:
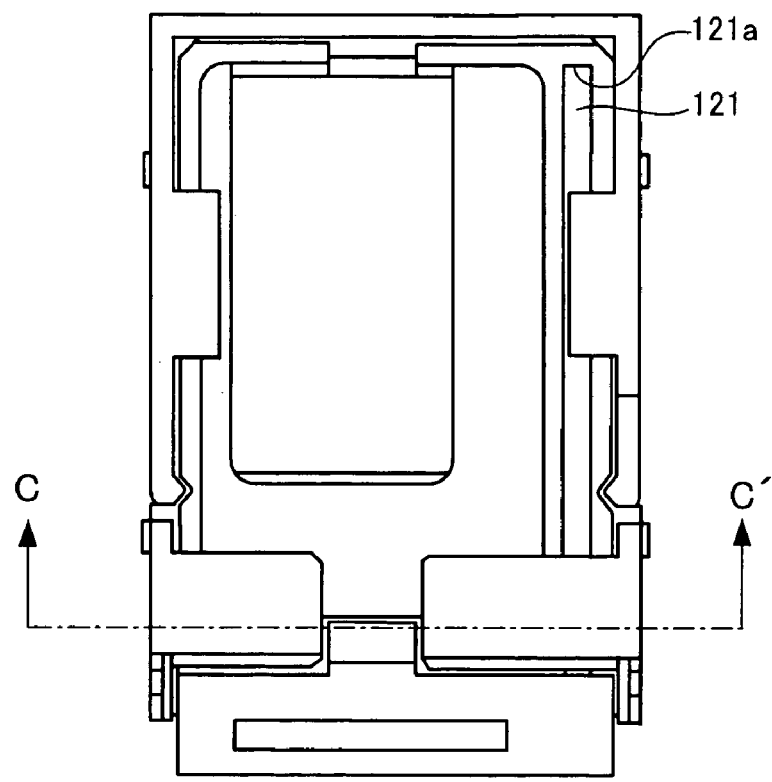
FIG. 14 is a plan view showing a guide in a card-type terminal according to a third embodiment of the present invention with a tray inserted in the guide.
Figure 15:
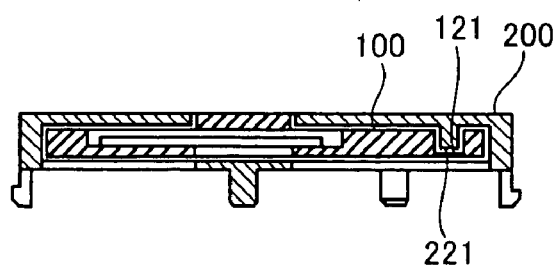
FIG. 15 is a sectional view taken along arrow C–C' in FIG. 14.

FIG. 14 is a plan view showing a guide in a card-type terminal according to a third embodiment of the present invention with a tray inserted in the guide while FIG. 15 is a sectional view taken along arrow C–C' in FIG. 14.

As shown in FIG. 14, the tray 100 has concave portions 121 formed in it and extending in the insertion direction. On the other hand, the guide 200 has convex portions 221 which fit in the concave portions 121. The convex portions 221 do not extend in the insertion direction. They are cylindrical bosses or the like which protrude downward from the guards 206. When the tray 100 is pulled out from the guide 200, the convex portions 221 hit a forward-end wall 121a of the concave portions 121 before the tray 100 is pulled out completely, preventing the tray 100 from being pulled out of the guide 200 any more.

Instead of the misinsertion prevention mechanism which prevents the tray from being inserted upside down (described with reference to FIGS. 10 to 13), a safety catch may be installed to prevent the tray 100 from coming off the guide 200, as described above in the third embodiment.

Incidentally, according to the third embodiment, when the tray 100 is inserted into the guide 200, the guards 206 are forced upward a little harder at the beginning, thereby deforming elastically, and the tray 100 are inserted into the guide 200 in this state.

Figure 16:
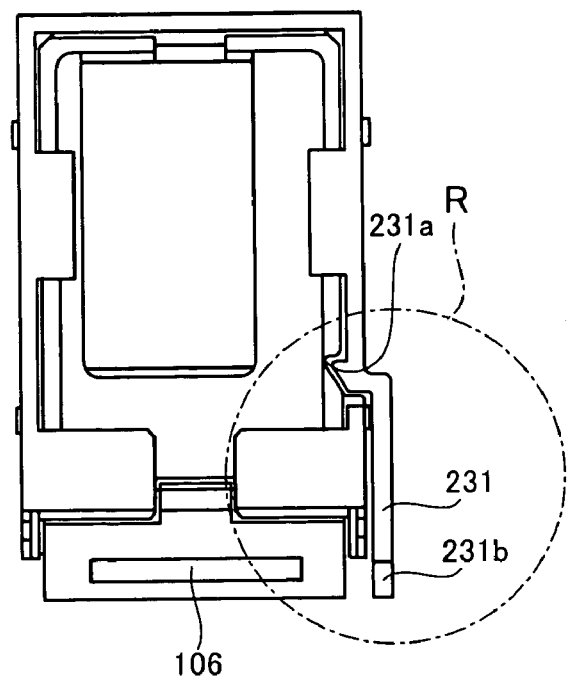
FIG. 16 is a plan view showing a guide in a card-type terminal according to a fourth embodiment of the present invention with a tray inserted in the guide.
Figure 17:
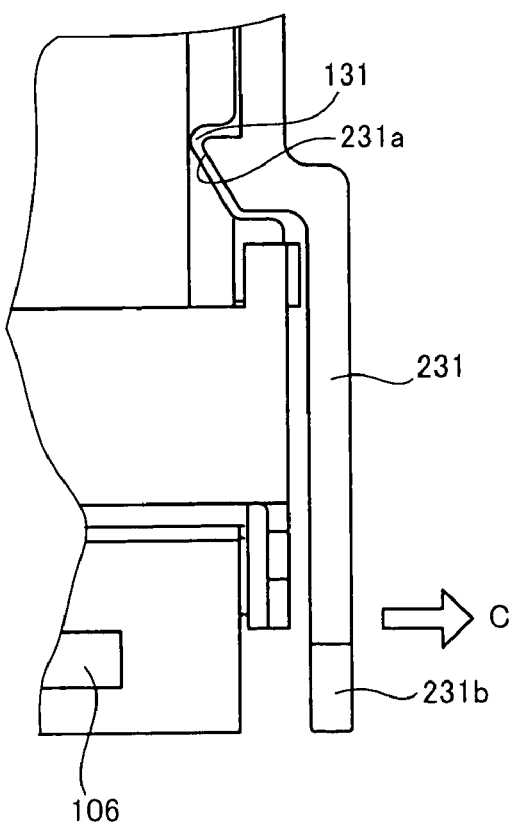
FIG. 17 is an enlarged view of the circled part R in FIG. 16.

FIG. 16 is a plan view showing a guide in a card-type terminal according to a fourth embodiment of the present invention with a tray inserted in the guide while FIG. 17 is an enlarged view of the circled part R in FIG. 16.

As shown in FIG. 17, a convex portion 231a which is part of a control lever 231 and serves as a guide-side restraining member is formed on the guide 200 and fits into a concave portion 131 which is formed in a lateral wall of the tray 100 and serves as a tray-side restraining member. The convex portion 231a and concave portion 131 are fitted one into the other with such force that the tray 100 cannot be pulled out from the guide 200 directly. The control lever 231 has, at its tip, a control end 231b which extends by the side of the loading slot 201 in the guide almost to where it lines up with the finger pull groove 106 in the tray 100. When the control end 231b is moved with a finger or nail to the right (in the direction of arrow C) in FIG. 16 the concave portion 131 of the tray 100 disengages from the convex portion 231a of the control lever 231, allowing the user to pull the tray 100 out of the guide 200 with a nail hooked into the finger pull groove 106.

This lock mechanism surely prevents the tray 100 from easily coming off the guide 200 inadvertently.

What is claimed is:

1. A card-type terminal comprising:
   a tray which can be slid in and out freely with a memory card mounted; and
   a guide which helps the tray slide in and houses the tray, wherein the memory card is placed on the tray, the tray is slid into the guide, and thereby the memory card is installed in the card-type terminal, and
   wherein the tray comprises a holder attached to a substantially middle point of a forward-end center section of the tray which secures, to the tray, a substantially middle point of a forward-end center section of the memory card mounted on the tray along an insertion direction of the tray, and an elastic restraining piece attached to a substantially middle point of a rearward-end center section of the tray, which secures, to the tray, a substantially middle point of a backward-end center section of the memory card mounted on the tray along the insertion direction of the tray.

2. The card-type terminal according to claim 1, comprising:
   a metal cover which covers the guide,
   wherein the guide comprises a pair of guards which demarcate a tray loading slot by sticking out from an edge of the metal cover and extend like cantilever beams from both sides of a width orthogonal to the insertion direction of the tray toward a center of the width, forming enough space between the guards to allow the elastic restraining piece to enter.

3. The card-type terminal according to claim 1, comprising a misinsertion prevention mechanism which prevents the tray from being inserted upside down into the guide.

4. The card-type terminal according to claim 3, wherein the misinsertion prevention mechanism consists of convex portions provided on either the tray or the guide and concave portions which are provided in the other and fit around the convex portion.

5. The card-type terminal according to claim 1, comprising a safety catch which prevents the tray from falling off when the tray is drawn from the guide.

6. The card-type terminal according to claim 5, wherein the safety catch consists of convex portions provided on either the tray or guide and concave portions which are provided in the other, extend in the insertion direction of the tray, slidably fit around the convex portions, and have an end wall brought into contact with the convex portions when the tray is pulled out from the guide.

7. The card-type terminal according to claim 1, wherein:
   the tray has a tray-side restraining member which restrains the tray in the guide when the tray is inserted in the guide; and
   the guide has a guide-side restraining member which engages with the tray-side restraining member when the tray is inserted in the guide and a control lever which disengages the guide-side restraining member from the tray-side restraining member in response to operation of an exposed control end of the control lever.

8. The card-type terminal according to claim 7, wherein the tray-side restraining member is a concave portion formed in a lateral wall of the tray and the guide-side restraining member is a convex portion which is formed on that part of the tray which corresponds to the concave portion and fits in the concave portion.

* * * * *